Patented Apr. 17, 1945

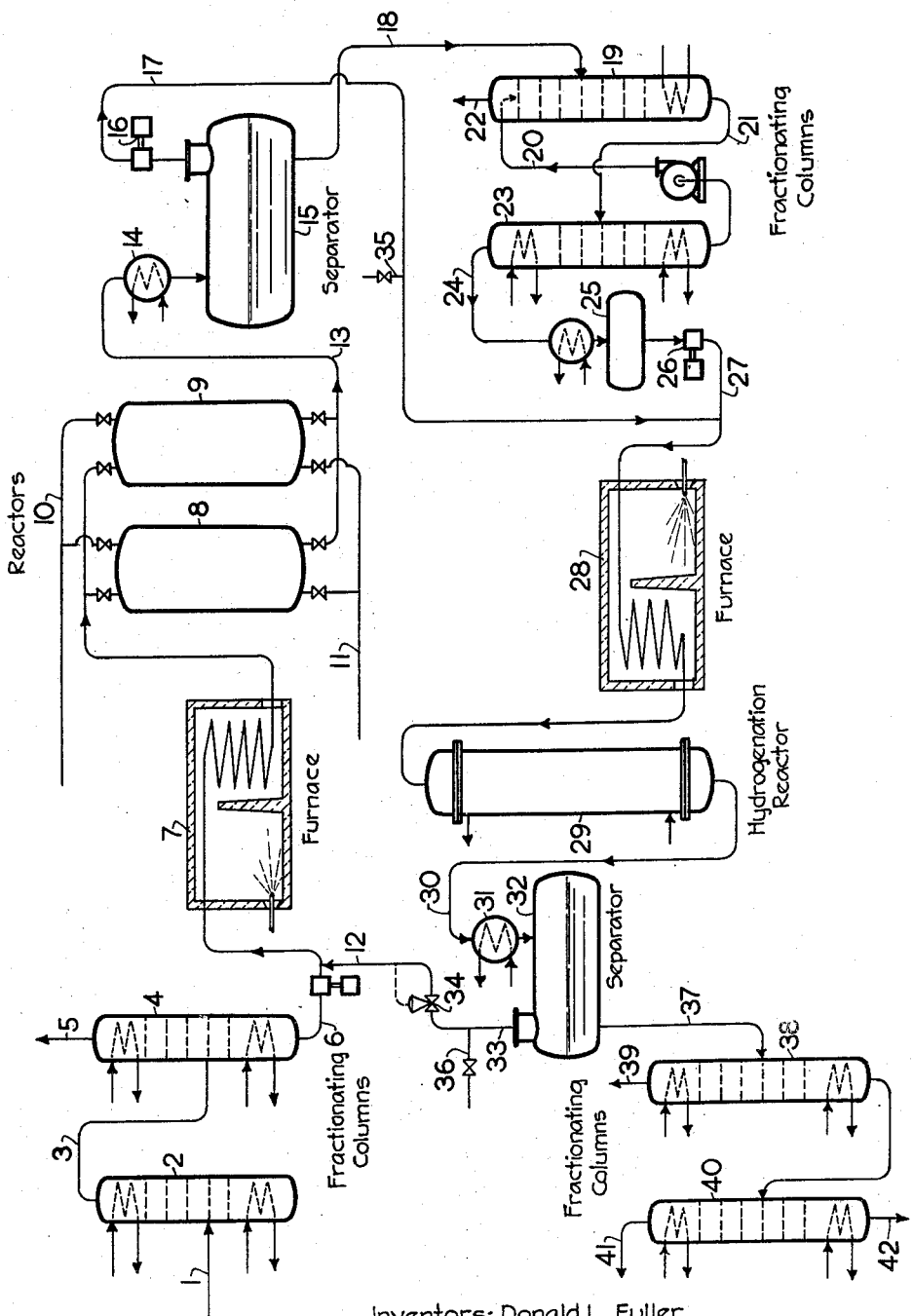

2,373,673

UNITED STATES PATENT OFFICE 2,373,673

PRODUCTION OF CYCLOHEXANE FROM PETROLEUM

Donald L. Fuller and Bernard S. Greensfelder, Oakland, Calif., assignors to Shell Development Company, San Francisco, Calif., a corporation of Delaware Application July 6, 1942, Serial No. 449,972

6 Claims. (Cl. 260—666)

This invention relates to a process for the production of pure or substantially pure cyclohexane from straight run naphthenic petroleum fractions.

The object of the invention is to provide a process whereby cyclohexane may be more economically produced as a relatively pure chemical from naphthenic petroleum fractions.

Cyclohexane, as is known, is a valuable chemical being used as a starting material for the syntheses of various important products and chemical intermediates. For such uses a pure or relatively pure cyclohexane is required. At present the available cyclohexane is produced from pure or relatively pure coal-tar benzene by hydrogenation. As a consequence, it is a relatively expensive chemical, of limited ultimate potential production.

It is known that certain straight run petroleum fractions contain appreciable quantities of cyclohexane. Attempts to recover this cyclohexane in a pure or relatively pure form have, however, not met with success due to the fact that the yields are quite low and the recovery of pure cyclohexane from the complicated mixture of hydrocarbons in such distillates is far too involved and costly to be practical. Consequently, no attempt is made at present to recover this cyclohexane as such.

Recently a method has been developed whereby relatively pure cyclohexane may be produced from such distillates. This method, which is described and claimed in copending application Serial No. 334,586, filed May 11, 1940, which issued October 20, 1942, as Patent Number 2,299,716, not only recovers cyclohexane naturally existing in such distillates but produces considerable amounts of additional cyclohexane from the methyl cyclopentane which is invariably found associated with the cyclohexane. According to the method of said copending application, the naphthenic distillate is fractionated to remove all material boiling above cyclohexane and, if desired, a portion of the cyclohexane. The lower boiling material is then subjected to a catalytic isomerization treatment whereby methyl cyclopentane is converted to cyclohexane and certain paraffinic hydrocarbons which are normally present and boil at substantially the same temperature as the cyclohexane are isomerized to lower boiling isomers. As a consequence of this isomerization treatment, the concentration of contaminating hydrocarbons is materially reduced, the concentration of cyclohexane in the fraction is materially increased, and impurities boiling with cyclohexane are altered in boiling point. It is therefore possible by careful fractionation to recover a cyclohexane of much better purity from this isomerized distillate than would be possible from the original distillate. While this method allows the recovery of relatively pure cyclohexane in good yields from naphthenic distillates, it does not yield cyclohexane of sufficient purity for many of the desired uses. This is due to the fact that the isomerization reactions come to an equilibrium before all of the materials are reacted, and this makes the separation resulting from change of boiling point incomplete. Consequently, in order to produce pure cyclohexanes by this method a further treatment of a different nature is required.

It has now been found that equivalent yields of cyclohexane of much better purity may be economically recovered from such distillates by a process which is totally different from the process just described. According to the process of the present invention, cyclohexane of any desired purity is recovered in excellent yields from naphthenic distillates by a combination of steps comprising a simultaneous isomerization and dehydrogenation followed by hydrogenation with suitable intermediate separation of certain materials which ordinarily make the separation of cyclohexane difficult or impossible.

The process of the present invention has been specifically developed for the production and recovery of cyclohexane in a pure or relatively pure form from straight run distillates from naphthenic petroleum, and more particularly the so-called $C_6$ fractions from such distillates. As will be pointed out below, however, it can also be advantageously applied for the production of certain cyclohexane homologues. Such $C_6$ fractions from such distillates invariably consist of a complicated mixture of hydrocarbons of naphthenic and paraffinic character, often containing small to appreciable amounts of aromatic and/or olefinic hydrocarbons. The paraffinic hydrocarbons are usually of both straight and branched chain structure, although the normal paraffins usually predominate. The naphthenic hydrocarbons in such fractions consist, in general, of substantial amounts of cyclohexane and methyl cyclopentane, often with minor amounts of other naphthenic hydrocarbons whose boiling points are within or over the boiling range of the distillate. These naphthenic hydrocarbons are often present due to their forming azeotropic mixtures with small amounts of benzene sometimes present. While the process is especially developed for the treatment of these straight run fractions, it is apparent that it can also be used with distillates of the described compositions regardless of the source.

The treatment of these distillates according to the process of the invention will be described in connection with the attached drawing forming a part of the specification wherein there is shown by means of conventional diagrammatic figures not drawn to scale an assembly of apparatus wherein the process may be conveniently executed. We are aware that the process of the invention may be executed in a wide variety of apparatus of conventional as well as special design. It is to be understood that the invention is not limited to the use of the specific apparatus illustrated and described.

A naphthenic straight run distillate such as a naphthenic straight run gasoline is first fractionated to remove undesired higher boiling materials. Thus, referring to the drawing, the naphthenic straight run gasoline entering via line 1 is fractionated in fractionating column 2 and a lower boiling fraction to be further treated is taken off overhead via line 3. The bottom product from fractionating column 2 is returned to the refinery. The upper boiling point of the overhead product from fractionating column 2 is chosen between about 75° C. and 85° C. The exact cut point between these approximate limits determines the maximum yield of cyclohexane obtainable and also to a certain extent determines the efficiency of the later-described separation steps and/or the purity of the product obtained. If the maximum boiling point of the fraction is, for example, 85° C. a maximum yield of cyclohexane will be obtained. If the maximum boiling point of the fraction is, however, 81° C. a purer product may be more easily obtained with only a slightly decreased yield. If, on the other hand, the maximum boiling point of the fraction is, for example, 76° C., the recovery steps are greatly simplified and a product of exceptional purity is easily obtained but the yields are considerably less than maximum.

The overhead product from fractionating column 2 is then preferably subjected to a second fractionation to separate lower boiling diluents. This fractionation, although not essential, contributes towards the economy of the process by reducing the amount of material treated in the subsequent steps in order to produce a given yield of cyclohexane. Thus, the overhead product from fractionating column 2 passes via line 3 to a second fractionating column 4 wherein lower boiling materials are separated and removed overhead via line 5. The maximum boiling point of the overhead product from fractionating column 4 may be any desired temperature below about 70° C. The bottom product from fractionating column 4 is a narrow boiling fraction boiling between about not above 70° C. to 75° C.–85° C. and contains substantially all of the methyl cyclopentane originally present in the naphthenic distillate as well as various amounts of the naturally present cyclohexane. If the upper boiling point is about 85° C., it contains substantially all of the naturally occurring cyclohexane and, on the other hand, if the upper boiling point is about 75° C., it contains only small amounts of the naturally occurring cyclohexane.

The straight run gasoline fraction leaving fractionator column 4 via line 6 is subjected to a catalytic treatment with a molybdenum oxide catalyst. It is to be specifically pointed out that the beneficial results of the treatment are only obtained with specific catalytic agents. Other catalytic agents of the same general type such as the oxides of Cr, Ti, V, Fe, Ni, Co, Cu, W, etc., do not give the desired results. While the process is specific to use of molybdenum oxide, this catalyst may be applied in any of the conventional forms. Thus, it may be used per se, as a mixed gel or supported upon a suitable carrier. A preferred catalyst comprises a minor amount of molybdenum oxide supported upon an active alumina. The alumina may be either alumina alpha monohydrate, gamma alumina or an alumina stabilized by reaction with a small amount of an oxide of an alkali metal or alkaline earth metal. The catalyst may also, if desired, contain relatively small amounts of promoters. A preferred concentration of molybdenum oxide in the described preferred catalyst is between about 4% and 30% by weight.

The treatment with the molybdenum oxide catalyst is effected under conditions quite similar to those employed in catalytic hydroforming with this catalyst. The temperature of the treatment may be varied between about 425° C. and 550° C., and preferably between about 450° C. and 500° C. The pressure may be from 3 atmospheres up to about 100 atmospheres but is preferably between about 5 and 50 atmospheres. The process is effected in the presence of a substantial concentration of added hydrogen. Suitable partial pressures of hydrogen are, for example, between 3 and 50 atmospheres. The conditions of temperature, pressure and partial pressure of hydrogen are adjusted within these limits to avoid any substantial destructive hydrogenation.

During use the catalyst gradually becomes coated with carbonaceous deposits and these are periodically removed by burning in the known manner.

Thus, again referring to the drawing, the material to be treated is vaporized and preheated to the desired reaction temperature in furnace 7 and then passed through the reactors 8 and 9 containing the molybdenum oxide catalyst. While one reactor, for example reactor 8, is processing, the other reactor is being regenerated in the known manner by regeneration gases entering via line 10 and leaving via line 11. The hydrogen gas recycled through the reaction zone with the feed is added in a mole ratio of 1:1 or greater to the feed via line 12. The product passes via line 13 to a cooler or heat exchanger 14, then to a separator 15, uncondensed gases are compressed in compressor 16 into line 17 to be used in the subsequent catalytic treatment as described below. The liquid product from separator 15 is next subjected to a treatment to remove a substantial portion of the paraffinic hydrocarbons which make the ultimate separation of relatively pure cyclohexane by fractional distillation difficult or impossible. This may be effected in a number of ways. In such cases where the maximum boiling point of the fractions subjected to the dehydrogenation treatment is below about 80° C., a simple fractionation can be advantageously employed. A preferred method is, however, to fractionate the product in the presence of a higher boiling polar solvent such, for example, as phenol, cresol, aniline, resorcinol, diacetin, or their equivalents. To this end the product from separator 15 is passed via line 18 to a fractionating column 19. The higher boiling polar solvent enters column 19 near the top via line 20 and is withdrawn from the bottom of line 21. The overhead product from column 19 consists essentially of undesired material and is removed from the system via line 22. The bottom product from column 19 is passed to a secondary column 23 wherein the higher boiling polar solvent is recovered as a bottom product and recycled back to column 19 via line 20. The overhead product from column 23 passes via line 24, accumulator 25, pump 26, line 27 and preheater 28 to a catalytic converter 29. The converter 29 is supplied with a suitable hydrogenation catalyst. Any of the hydrogenation catalysts commonly employed in the hydrogenation of petroleum fractions and products may be used. Suitable catalysts, for example, are cobalt, nickel, nickel oxide, copper-chromium oxide, copper chromite, nickel-tungsten sulfide, molybdenum sulfide, etc. The reaction conditions in catalytic converter 29 are adjusted, according to the catalyst, to effect substantial hydrogenation of olefinic and aromatic hydrocarbons but are not sufficiently drastic to effect destructive hydrogenation. These conditions are well known in the art. The hydrogen required in this step is supplied primarily from the preceding catalytic step via compressor 16 and line 17. The product from the catalytic converter 29 passes via line 30 to a cooler or heat exchange device 31 and then to a separator 32 wherein the liquid product is separated from the excess hydrogen and any gaseous products. The hydrogen separated in separator 32 passes via line 33 and valve 34 to line 12 and is thus recycled to the first described reaction zone. In order to avoid excessive dilution of the recycled hydrogen with gaseous products, a portion of the recycled hydrogen may be periodically or continuously withdrawn from the system via line 35 and a suitable amount of fresh hydrogen added via line 36.

The liquid product in separator 32 contains some or all of the cyclohexane originally in the gasoline feed stock, depending upon the maximum boiling point of the fraction treated, plus cyclohexane produced from the methyl cyclopentane in the feed stock. Also, such amounts of benzene present in the original feed stock may have been largely converted to cyclohexane. It is a crude cyclohexane fraction. Since by the described sequence of steps the constituents which make the fractionation of cyclohexane from straight run gasolines difficult or impossible have been largely eliminated, cyclohexane of substantial purity may easily be recovered from this crude product by suitable known methods. Generally, a relatively efficient fractional distillation is sufficient to produce cyclohexane meeting with the usual requirements. Thus, the liquid product from separator 32 is passed via line 37 to a fractionating column 38 wherein lower boiling impurities are removed overhead via line 39 and the residue is directed to a fractionating column 40 wherein the cyclohexane of the desired purity is separated and removed via line 41. Higher boiling impurities are removed from the system from the bottom of fractionating column 40 via line 42.

While in the above we have described the process of the invention as applied in the production of cyclohexane, it is also possible to utilize the process for the production of methyl cyclohexane or dimethyl cyclohexane. In these cases the process is effected in the same manner except that a fraction of the naphthenic straight run gasoline consisting essentially of the hydrocarbons containing seven or eight carbon atoms, respectively, is separated and subjected to the described sequence of treating steps. In the case of the production of dimethyl cyclohexane it is difficult to obtain a pure product. This is due to the greater complexity of the material treated and the number of isomers of the product encountered. In the case of the production of methyl cyclohexane, on the other hand, the process is of exceptional advantage and may, in fact, if desired, be somewhat simplified. Thus, in the production of methyl cyclohexane the liquid product from separator 15 may be subjected to a conventional fractional distillation without the use of the higher boiling polar solvent to remove material boiling up to, for example, 105° C. and the bottom product then passed directly to heater 28 and catalytic converter 29. The fraction separated and subjected to the catalytic treatment with the molybdenum oxide catalyst in this case preferably boils from about 86° C.–93° C. to about 100° C.–104° C.

We claim as our invention:

1. A process for the production of cyclohexane from naphthenic petroleum distillates of the nature of gasoline which comprises separating from a naphthenic petroleum distillate by fractional distillation a fraction having an initial boiling point below about 70° C. and a final boiling point between about 75° C. and 85° C., said fraction containing substantially all of the methyl cyclopentane naturally occurring in said distillate, treating said fraction under hydroforming conditions in the presence of at least one mol proportion of hydrogen with a catalyst, the predominant active constituent of which is molybdenum oxide, removing paraffinic hydrocarbons from the thus-treated product, subjecting the remainder to a catalytic hydrogenation treatment with hydrogen-containing gases from the abovesaid treatment with molybdenum oxide catalyst, and separating cyclohexane from the hydrogenated product.

2. Process according to claim 1 wherein the fraction subjected to the treatment with molybdenum oxide catalyst boils up to about 85° C.

3. Process according to claim 1 wherein the fraction subjected to the treatment with molybdenum oxide catalyst boils up to about 81° C.

4. Process according to claim 1 wherein the fraction subjected to the treatment with molybdenum oxide catalyst boils up to about 75° C.

5. Process according to claim 1 wherein the fraction subjected to the treatment with molybdenum oxide catalyst boils up to about 85° C. and the removal of paraffinic hydrocarbons is by extractive distillation.

6. Process according to claim 1 wherein the fraction subjected to the treatment with molybdenum oxide catalyst boils up to about 75° C. and the removal of paraffinic hydrocarbons is by fractional distillation.

DONALD L. FULLER.
BERNARD S. GREENSFELDER.